United States Patent Office 2,993,496
Patented July 25, 1961

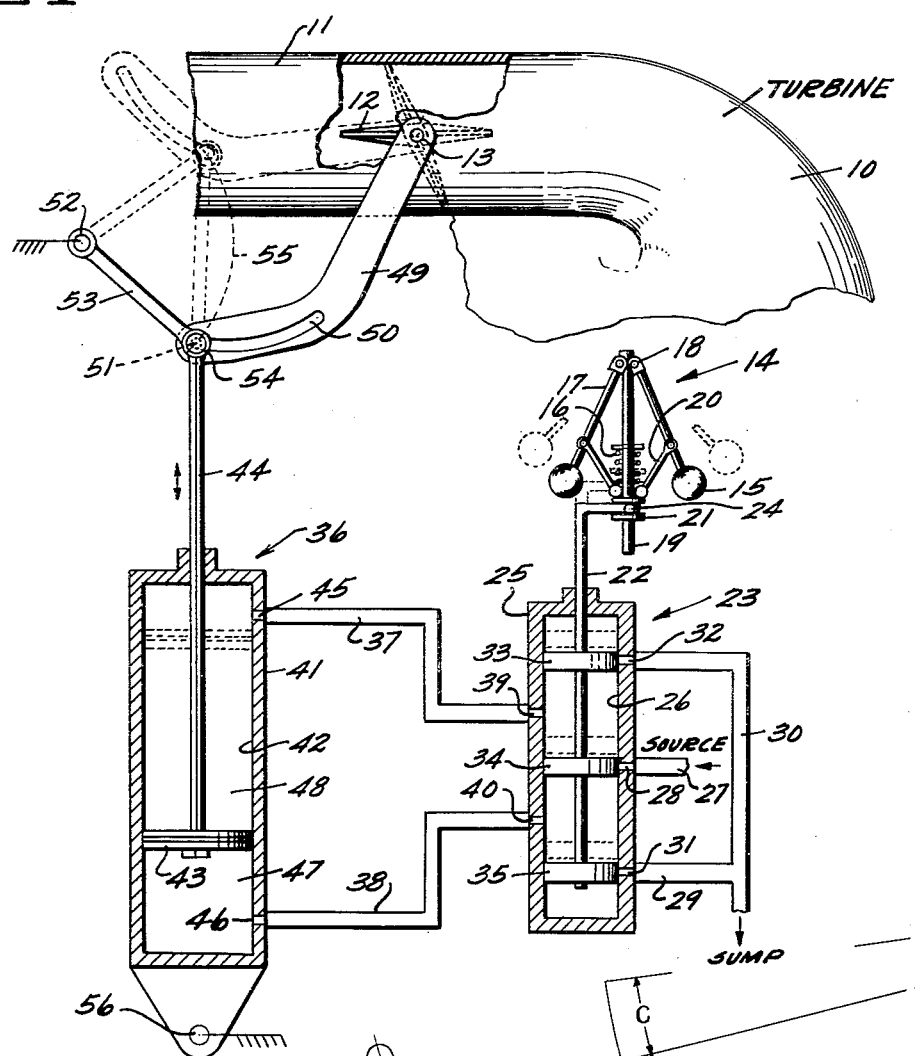

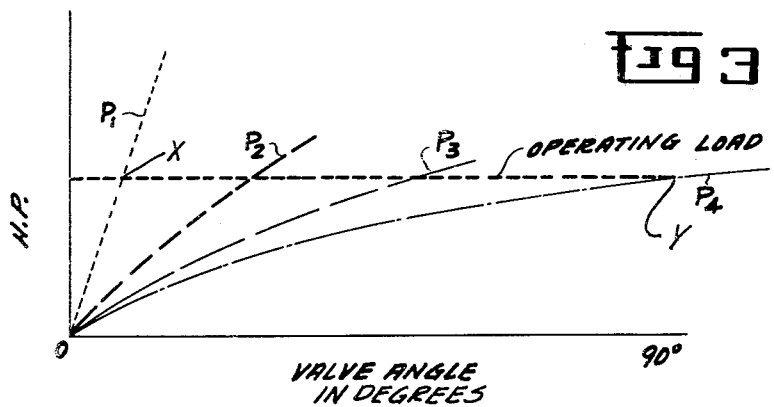
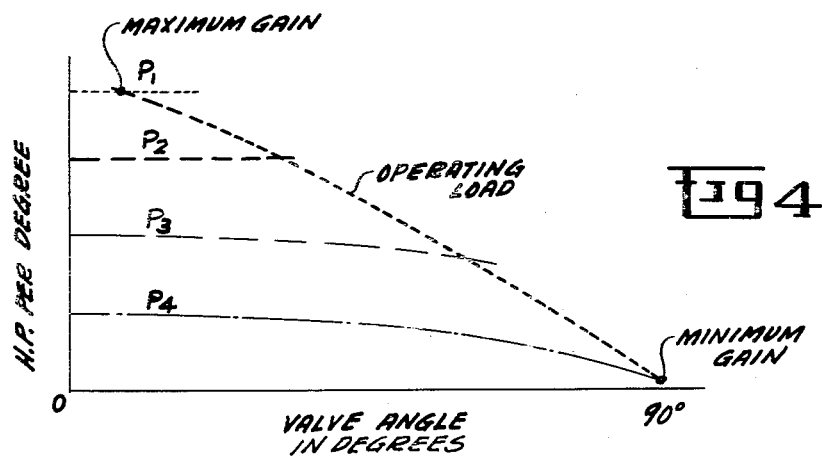
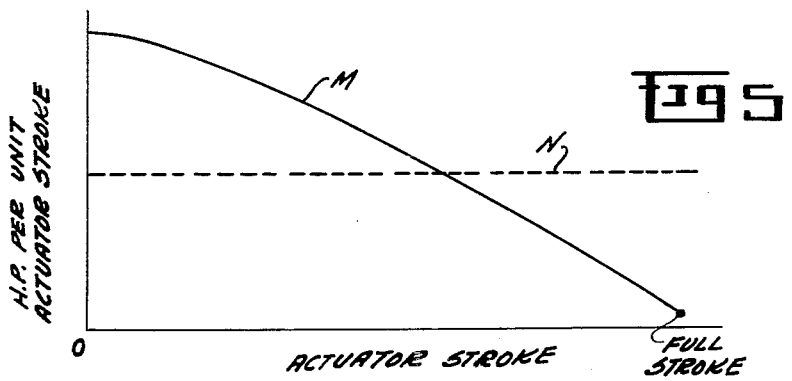

2,993,496
GAS TURBINE FLOW CONTROL ARRANGEMENT
Richard Holmes Ackley, Beverly, Mass., assignor to General Electric Company, a corporation of New York
Filed Nov. 19, 1957, Ser. No. 697,446
4 Claims. (Cl. 137—34)

My invention relates to fluid flow regulating devices for controlling the speed of fluid turbines, and has particular application to air and other gas turbines which are subject to wide variations in inlet energy conditions, such as, for example, air turbines which are employed in aircraft applications and which operate on compressed air extracted from the jet engine compressor.

In certain applications where gas turbines are employed, particularly in aircraft accessory drive installations where one or more turbines are driven by compressed air extracted from a jet engine compressor, the inlet energy conditions at the turbine, primarily represented by the pressure level at the turbine inlet and by the pressure ratio across the turbine, may vary over a wide range. For example, in aircraft air turbine drive applications, the pressure available at the turbine inlet varies with aircraft speed, engine throttle setting, altitude, the magnitude of pressure losses such as duct losses between the engine compressor and the turbine and a number of other factors, while the turbine discharge pressure, which also affects the pressure ratio across the turbine and thus available energy, varies with airplane altitude and exhaust duct pressure losses. It will be appreciated by those skilled in the art that in applications of the type just described the available energy at the turbine can vary over a very considerable range, in some cases by a factor of more than 20 to 1. It is in configurations of this general type that my invention finds particular application.

It is well known that relatively large variations in gas turbine inlet energy conditions can present serious problems with respect to the regulation of the gas flow to the turbine for controlling the speed thereof at a preselected level. One of the primary reasons for this is the large variation in sensitivity or gain of the flow regulating element which accompanies the change in energy conditions. Consider, for example, an air turbine having a pressure throttle valve located in its inlet ducting for regulating the flow of air to the turbine. At very high turbine inlet pressure conditions and high turbine pressure ratios the amount of energy delivered to the turbine per unit rotational movement of the valve is relatively very large. Using well known units, the number of horsepower delivered to the turbine per degree of rotation of the valve is relatively high. This type of sensitivity of a control element is commonly referred to as "gain" and the condition just described would thus be known as the high gain condition. Where, as opposed to the condition just set forth, the turbine inlet pressure and available pressure ratio are very low, the amount of energy deliverable to the turbine per unit rotational movement of the valve, and thus the gain of the flow regulating element, would also be correspondingly reduced.

A relatively large variation in the gain of the flow regulating element can cause serious problems in the speed regulating system of the turbine. For instance, if the sensitivities or gains of the remaining elements of the speed control system are selected to provide for a stable regulation of speed at the high gain condition of the flow regulating element corresponding to maximum turbine inlet energy conditions, it becomes difficult or impossible in some cases to satisfy the transient performance requirements of the system when the flow regulating element is at its low gain condition corresponding to minimum turbine inlet energy conditions. In other words, at the low gain condition, the system may become too sluggish to correct for changes in turbine load or for other system disturbances within the required time or without exceeding maximum speed undershoot and overshoot requirements.

On the other hand, if the combined gain of the remainder of the system is made sufficiently high to satisfy transient performance requirements with the flow regulating element at its low gain condition, the system may approach instability and be subject to severe sustained oscillations in speed as the gain of the flow regulating element approaches its maximum value with increasing turbine inlet energy conditions.

I have observed that in gas turbine applications of the type described above, particularly those utilizing air turbines controlled by inlet throttle valves, the gain of the flow regulating element varies in accordance with a fixed relationship to its stroke for any preselected fixed load with a given range of operation conditions.

It is accordingly one of the objects of my invention to provide a gas turbine flow regulating arrangement in which the variation in gain of the flow regulating means otherwise caused by changes in turbine energy conditions is substantially reduced.

It is a further object of my invention to provide a novel linkage arrangement for an air or gas turbine flow regulating throttle valve, the gain characteristics of which linkage vary with stroke in an inverse manner to the variations in gain of the throtle valve for a given range of turbine inlet energy conditions.

Briefly stated, my invention contemplates, in accordance with one aspect thereof, the provision of a variable gain linkage interconnecting the turbine flow regulating element and the actuating means therefor, the arrangement being such that the gain of the linkage is caused to vary with the stroke of the actuating means in an inverse manner to the variation in gain of the flow regulating element. The variation in gain with actuator stroke is accomplished, in one embodiment of my invention, by means of a lever arm secured to the turbine throttle valve or other flow regulating element and having therein an elongated slot which is engaged by an actuating element, the configuration being such that at small throttle valve angles near the closed position a given movement of the actuating element produces a smaller valve movement than is produced by the same movement of the actuating element when the valve is near its open position, the gain of the linkage means varying continuously with stroke in a manner hereinafter set forth in greater detail.

Other objects and advantages of my invention will be apparent from the following description taken in connection with the accompanying drawings, in which:

FIG. 1 is a schematic view of a portion of an air turbine speed control system embodying my invention;

FIG. 2 is an enlarged view of the elongated slot in the throttle valve actuating arm illustrating its shape and its relationship to actuator stroke; and FIGS. 3, 4 and 5 are graphical presentations of turbine and throttle valve characteristics for a typical application illustrating the variation in throttle valve gain and the relationship of the gain of the linkage means thereto.

Referring now in particular to FIG. 1 of the drawings, there is shown an air turbine having a turbine inlet casing 10 and an inlet duct 11 connectible to a suitable source of compressed air for driving the turbine. The flow of air to the turbine is controlled by means of a flow regulating element such as a throttle valve or butterfly valve 12 which is rotatably mounted in the inlet duct 11 in any suitable manner such as by means of a shaft 13 mounted in suitable bearings secured in the duct 11.

In the embodiment shown, the speed of the turbine is regulated at some preselected level by means of a speed control system having a speed responsive element such as a flyball governor 14 having two or more flyweights 15 operating against a reference spring 16. Each flyweight 15 is secured to a rod 17, which is in turn pivotally mounted at 18 on a governor drive shaft 19. The rods 17 are connected by means of links 20 to a sleeve member 21 slidably mounted on the shaft 19 such that radial movements of flyweights produce longitudinal movements of the sleeve 21 along the governor shaft. The reference spring 16 may be adjustable in any well known manner to permit adjustment of the position of the sleeve 21 for a preselected governor speed to establish a desired reference speed. The sleeve 21 engages a stroking arm 22 of a hydraulic pilot valve 23, the arm 22 being provided with a suitable bearing member 24 at the point of engagement with the rotatable sleeve 21.

The pilot valve 23 comprises a casing 25 having a cylindrical bore 26, the interior of the pilot valve being connected to a source of hydraulic fluid pressure by means of a conduit 27 and an aperture 28 extending through the valve casing. Connections to the drain or sump side of the hydraulic fluid pressure system are accomplished by means of conduits 29 and 30 which are connected to apertures 31 and 32 respectively in the pilot valve casing as shown.

Secured to the stroking arm 22 are three cylindrical valve elements or lands 33, 34 and 35 which fit snugly within the bore 26 of the pilot valve and which are movable therein with the stroking arm 22 to accomplish porting of the hydraulic fluid in a manner hereinafter to be described. The pilot valve 23 is connected to an actuator 36 by means of fluid conduits 37 and 38 which are secured in fluid communication with ports or apertures 39 and 40 respectively in the pilot valve casing 25.

The actuator 36 comprises a casing 41 having an inner cylindrical bore 42 and a piston 43 engaging the bore 42 and longitudinally movable therein in response to fluid pressure differentials across the piston. An actuating element or rod 44 is secured to the piston 43 in any suitable manner so as to be movable therewith and extends from the actuator casing as shown. The conduits 37 and 38 are connected to apertures 45 and 46, which extend through the actuator casing 41 into chambers 47 and 48 at either side of the limits of travel of the piston 43.

It will be observed that as the flyweights 15 of the governor are caused to move in response to changes in the speed of the turbine, corresponding movements of the pilot valve stroking arm 22 occur, porting high pressure hydraulic fluid to one side of the actuator piston and connecting the other side to the system drain to cause movement of the actuator piston in one direction or the other. For example, assume that the system is in its steady state condition with the pilot valve lands 33, 34 and 35 in the lapped position as shown in the solid lines, and that by reason of a system disturbance, such as a change in load, the speed of the turbine, and thus that of the governor, is increased above its preselected reference level. The increase in speed causes the governor flyweights 15 to move radially outward by an amount dependent on the magnitude of the speed error. A position of the flyweights representing an excess speed condition is shown by the dotted lines in FIG. 1. The corresponding positions of the stroking arm 22 and the valve members 33, 34 and 35 of the pilot valve are also shown in dotted lines.

It will be observed that with the elements of the governor and the pilot valve in the positions represented by the dotted lines, the aperture 28 is uncovered by the valve land 34 in such a manner as to port hydraulic fluid pressure from the source to the chamber 47 in the actuator, and the aperture 32 is uncovered in such a manner as to establish fluid communication between the actuator chamber 48 and the system drain or sump. Thus a pressure differential tending to force the actuator piston in the upward direction is created.

A similar analysis will indicate that upon radially inward movement of the flyweights from the steady state position caused by an underspeed condition, the pilot valve stroking arm is moved downward uncovering the aperture 28 to port fluid pressure to the actuator chamber 48 and uncovering the drain port 31 to connect the actuator chamber 47 to system drain. It will be seen that the pressure differential thus created exerts a force on the actuator piston 43 tending to move it in the downward direction.

In systems of this general type in which corrections in fluid flow to a turbine are to be made by moving a flow regulating element, such as the throttle valve 12, in response to a speed error signal, it has been a common practice to mechanically connect suitable actuating means, such as the actuator 36 directly to an operating lever, or some such similar device, secured to the turbine flow control valve. With such an arrangement, the angular movement of the flow control valve per unit linear movement of the actuator either remains substantially constant over the full range of actuator stroke or, depending upon the configuration employed, varies by only a relatively small amount due to slight and unavoidable changes of the lever arm with actuator stroke. In such a case the gain of this portion of the control system, which can be stated in terms of units as degrees of valve rotation per inch of actuator stroke, remains relatively constant with actuator stroke, and any changes in turbine energy conditions thus directly affect the sensitivity or gain of the speed control system, the problems created by relatively large changes having already been previously discussed.

My invention contemplates the insertion of a variable gain arrangement between the flow regulating means and the actuating means, the characteristic of this arrangement being such that the gain or sensitivity thereof varies with actuator position in an inverse manner to the variation in gain of the flow regulating element, such that the variation in gain of the total control system otherwise caused by changes in energy conditions is substantially reduced. In the embodiment of my invention shown, I accomplish this by providing lever means such as an arm 49, secured to the throttle valve shaft 13 so as to permit rotation thereof, and having an elongated slot or passage 50 therein.

The slot 50 is engaged for actuation purposes in any suitable manner, such as by means of pin 51 which extends laterally into the slot and which is of a diameter such as to minimize backlash while permitting sufficient clearance to allow a rolling movement of the pin in a direction generally perpendicular to its axis along the extent of the slot 50. The path of allowable movement of the pin 51 is established about a fixed pivot point 52 by means of a rod element 53 which is rotatably secured at one end to the pivot 52 and which is connected at its other end to the pin 51 by means of a bearing member 54. Also connected to the pin 51 through the bearing member 54 is the output rod 44 of the actuator 36, the connection to both the rod 44 and the rod 53 being such that the pin 51 is rotatable within the bearing 54 with respect to these elements to allow it to roll along the slot 50.

With the arrangement just described, it will be observed that the travel of the pin 51 is limited to an arcuate path, illustrated by the dotted line 55, about the fixed pivot 52, the actuator 36 being pivotally mounted at a fixed pivot 56 to allow the rod 44 to follow this movement. It will be seen that upward movement of the actuator piston 43 causes the throttle valve 12 to move toward the closed position and that downward movement of the actuator piston causes the throttle valve to move toward the open position. The positioning of the slot 50 and the path thereof relative to the path of the pin 51 is such that when the valve 12 is in its full open position with the elements in the positions shown in the solid lines, the longitudinally extending surfaces of the slot 50 are nearly perpendicular to the arcuate path 55 of movement of the pin 51 so that the slot 50 does not produce any substantial inclined plane ratio between movements of the actuator rod 44 and the valve arm 49. It will be observed, on the other hand, by reference to the positions of the elements as shown in the dotted lines, which correspond to the throttle valve closed positions, that as the throttle valve is moved toward the closed position and the pin 51 moves upwardly along the path 55, the slot 50 is tilted by a continuously increasing amount with respect to the path 55, the surfaces of the slot 50 representing an inclined plane approaching the slope of the path 55 as the valve is moved toward the closed position. The effect is the introduction of a variable, inclined plane type of ratio that reduces the amount by which the valve is rotated per unit movement of the actuator rod 44 as the valve is moved toward the closed position.

The limit of this variable ratio can be approached if the slot 50 is allowed to tilt to the point where the slope of that portion of its surface in contact with the pin 51 becomes parallel with the path 55 of the pin. It will be readily appreciated that, at such a point, incremental movements of the pin 51 along the path 55 would produce no movement of the arm 49 and the gain of the linkage would be zero. In the particular embodiment shown, it will be observed that this limit point is not reached within the stroke range employed.

This arrangement is further illustrated in the enlarged, fragmentary view of FIG. 2 showing the relationships between the pin 51 and the slot 50 for several different positions and the corresponding movements of the other elements involved. It will be observed that as the pin 51 is moved through an angle A from position 1 to position 2, the throttle valve is rotated through an angle B as measured by the angular sweep of a fixed reference point on the slot. As the slope of that portion of the slot 50 in contact with the pin 51 changes with position, however, it will be seen that as the pin 51 is moved through a second and equal angular increment A from position 2 to position 3, the throttle valve is rotated only by an angular amount represented by C, which is considerably smaller than the angle B. Thus, the gain of the linkage decreases as the throttle valve is moved toward the closed position.

Referring now to FIG. 3, there is shown a graphical representation of a typical air turbine throttle valve characteristic in terms of horsepower delivered to the turbine versus throttle valve angle for various inlet pressures, the turbine discharge pressure being assumed constant in order to simplify the example. P1 represents the maximum turbine inlet pressure for the range selected and P4 represents the minimum turbine inlet pressure, while the horizontal, dotted line represents a given fixed operating load, preferably the maximum steady state operating load to be considered. For any given operating pressure, the gain of the throttle valve element for that pressure condition is represented by the slope of the corresponding pressure line at the load selected.

For instance, considering the operating load shown, the gain of the valve at that load and at the maximum inlet pressure P1 is the slope of the line P1 at its intersection X with the operating load line. At the same load, but with the turbine inlet pressure reduced to the minimum P4, the gain of the valve is the slope of the line P4 at its intersection Y with the operating load line. It will be seen that for the system portrayed in FIG. 3, the gain of the valve at the intersection X represents the maximum gain while that at the intersection Y represents the minimum gain.

This material is presented in another form in FIG. 4 in terms of throttle valve gain in horsepower per degree vs. valve angle in degrees. It will be seen that for the operating load selected, the throttle valve gain varies from a maximum corresponding to the intersection of the load line with the maximum pressure line P1 to a minimum at the intersection of the load line with the minimum pressure line P4. Thus, it will be observed that for a given operating load and a given range of turbine inlet conditions the gain of the valve occupies a fixed relationship to valve angle as represented by the operating load line in FIG. 4.

Referring now to FIG. 5, this relationship is plotted in terms of combined actuator and valve gain vs. actuator stroke, the line M representing the characteristic obtained with a substantially constant gain type of actuator of the type heretofore commonly employed. In other words, the gain represented by the line M is obtained by multiplying the gain of the throttle valve by the gain of the actuator which operates the valve. Since the line M represents a case where the gain of the actuator remains relatively constant over the full stroke of the actuator, it will be observed that its characteristic shape is the same as that of the throttle valve gain as represented in FIG. 4.

In fact, it will be observed that if a throttle valve having a variation in gain with angular position as shown in FIG. 4 is combined with any number of series elements representing a full control loop, the variation in gain of the complete loop will have the same characteristic as that of the valve gain. Thus it will be seen that in such a case the gain of the entire system varies with the angular position of the valve, the system gain being a maximum for the particular case illustrated when the valve is near its closed position and being a minimum when the valve is near its full open position.

In the embodiment of my invention shown, the variable ratio of the linkage between the actuator and the throttle valve is such that the mechanical amplitude ratio between the output and the input of the linkage varies in an inverse manner with actuator stroke to the variable gain characteristic of the throttle valve so that, when the magnitudes of the gains of these elements are multiplied together, the combined characteristic representing the energy delivered to the turbine per unit of actuator stroke is substantially constant over the full stroke range as shown by the dotted line N in FIG. 5. In other words the gain of the linkage is made such that at any point in the stroke of the actuator corresponding to a certain angular position of the valve, the gain of the linkage at that point when multipled by the gain of the throttle valve at the same point is a preselected value, this value being substantially constant for all corresponding positions of the linkage and the valve. Thus, it will be seen that when the combined gain of the actuator and the valve elements as represented by the line N is combined with any number of constant gain series elements representing the elements of the full control system, the gain of the total system remains constant and is not affected by variations in the gain of the throttle valve.

It will be appreciated that, in certain applications of my invention, it may be unnecessary to provide inverse ratio characteristics of a magnitude sufficient to provide a substantially constant gain over the full position range and that it may be sufficient to provide only a preselected reduction in the variation in gain characteristics of the system in order to obtain substantial advantages of the type set forth above. It will also be apparent that my invention may be applied to turbine systems having characteristics other than the particular one shown, although it is known to provide particularly significant advantages in applications of the general type shown and described herein.

Thus, it is obvious from the foregoing that various changes, combinations and substitutions may be made in accordance with the teachings set forth herein without departing from the true scope and spirit of my invention as defined in the following claims.

What I claim as new and desire to secure by Letters Patent of the United States is:

1. A speed control system comprising a gas turbine subjected to variations in turbine inlet energy conditions, speed responsive means producing a signal in response to variations in the speed of said turbine from a preselected level, flow regulating means including a throttle valve for regulating the flow of gas to said tubine, an actuator operatively connected to said speed responsive means so as to be positioned in response to said signal, and linkage means interconnecting said actuator and said flow regulating means, said linkage means having an amplitude ratio between the input and output movements thereof variable with the position of said actuator, said variable amplitude ratio being selected to provide a gain characteristic which varies in an inverse manner to the relationship between the incremental energy delivered to said turbine per unit movement of said flow regulating means and the position of said flow regulating means for a preselected range of turbine inlet energy conditions and for a preselected substantially constant load on the turbine.

2. An air turbine drive comprising an air turbine having inlet duct means connectible to a supply of compressed air, a speed control system for regulating the speed of said turbine at a preselected reference level comprising a throttle valve rotatably mounted in said inlet duct, speed responsive means producing a signal in response to variations in the speed of said turbine drive from said reference level, an actuator operatively connected to said speed responsive means so as to be positioned in response to said signal, and linkage means interconnecting said throttle valve and said actuator, said linkage means having a mechanical output over input ratio variable with the position thereof to provide a larger incremental rotation of said throttle valve per unit incremental movement of said actuator when said valve is near its open position than when said valve is near its closed position, said ratio varying inversely with the variation in the gain of said throttle valve with angular position for a preselected range of turbine energy conditions and for a preselected substantially constant load on the turbine.

3. Apparatus as set forth in claim 2 wherein said linkage means comprise an arm connected to said throttle valve to permit rotative movement thereof, an elongated slot in said arm, means connecting said actuator in operative engagement with said slot, fixed pivot means, and means connecting said actuator to said fixed pivot means to establish the point of engagement of said actuator with said slot as a function of the position of said actuator, whereby an inclined plane ratio variable with the positions of said actuator and said arm is provided.

4. A speed control system comprising a gas turbine subject to variations in turbine inlet energy conditions, speed responsive means producing a signal in response to variations in the speed of said turbine from a preselected level, flow regulating means operable between a closed and an open position for regulating the flow of gas to said turbine, the gain of said flow regulating means increasing with increasing turbine inlet energy conditions and decreasing with decreasing turbine inlet energy conditions, the characteristic of said flow regulating means being such that for a preselected substantially constant load the operating range of positions thereof moves toward the closed position as the turbine inlet energy level increases and toward the open position as the turbine inlet energy level decreases, an actuator operatively connected to said speed responsive means so as to be positioned in response to said signal, and variable gain means interconnecting said actuator and said flow regulating means, said variable gain means providing an amplitude ratio between the output and input thereof which for a substantially constant load on the turbine varies with the magnitude of the input thereto in an inverse relationship to the variation in gain of said flow regulating means over a preselected range of turbine inlet energy conditions and for a preselected range of positions of said flow regulating means.

References Cited in the file of this patent

UNITED STATES PATENTS

| 1,533,767 | Schmidt | Apr. 14, 1925 |
| 1,689,893 | Royce | Oct. 30, 1928 |
| 2,141,260 | Caughey | Dec. 27, 1938 |
| 2,551,791 | De Giers | May 8, 1951 |

FOREIGN PATENTS

| 5,150 | Great Britain | Feb. 27, 1914 |